Dec. 13, 1966 G. F. EAST 3,290,948
GYROSCOPE

Original Filed Dec. 4, 1961 2 Sheets-Sheet 1

INVENTOR.
GEORGE F. EAST
BY
ATTORNEY

Dec. 13, 1966 G. F. EAST 3,290,948
GYROSCOPE

Original Filed Dec. 4, 1961 2 Sheets-Sheet 2

INVENTOR
GEORGE F. EAST
BY
ATTORNEY

United States Patent Office 3,290,948
Patented Dec. 13, 1966

3,290,948
GYROSCOPE
George F. East, Whittier, Calif., assignor to Clary Corporation, San Gabriel, Calif., a corporation of California
Original application Dec. 4, 1961, Ser. No. 156,839, now Patent No. 3,142,184, dated July 28, 1964. Divided and this application Aug. 9, 1963, Ser. No. 301,038
3 Claims. (Cl. 74—5)

This is a division of application Serial No. 156,839, filed December 4, 1961, now Patent No. 3,142,184.

This invention relates to gyroscopes and has particular reference to universal or gimbal supporting means therefor.

In certain gyroscope applications, such as guided missiles, it is highly desirable to reduce the weight and size of the gyroscope to a minimum without impairing its efficiency. This generally requires that the rotor diameter be as large as possible relative to the gyroscope casing to provide the highest possible angular momentum, consistent with the speed of the rotor.

Heretofore, gyroscopes of the above type have generally been mounted in gimbal rings which surround the rotor and permit universal movement of the gyroscope case relative to the rotor so that the rotor may retain its initial attitude in space relative to the gyroscope case or base. Therefore, the diameter of the rotor heretofore has been generally limited by the size of the surrounding gimbal rings.

Accordingly, it is a principal object of the present invention to provide a universal or gimbal mounting for a gyroscope in which the diameter of the rotor is not restricted by the size of the universal or gimbal support therefor.

Another object is to provide a universal gimbal mounting for a gyroscope in which the mounting is located within the confines of a hollow rotor.

Another object is to reduce the overall weight and size of a gyroscope unit.

A still further object is to provide a gyroscope and universal mounting which may be readily assembled or dismantled.

The manner in which the above and other objects of the invention are accomplished will be readily understood on reference to the following specification when read in conjunction with the accompanying drawings, wherein.

Figure 1:
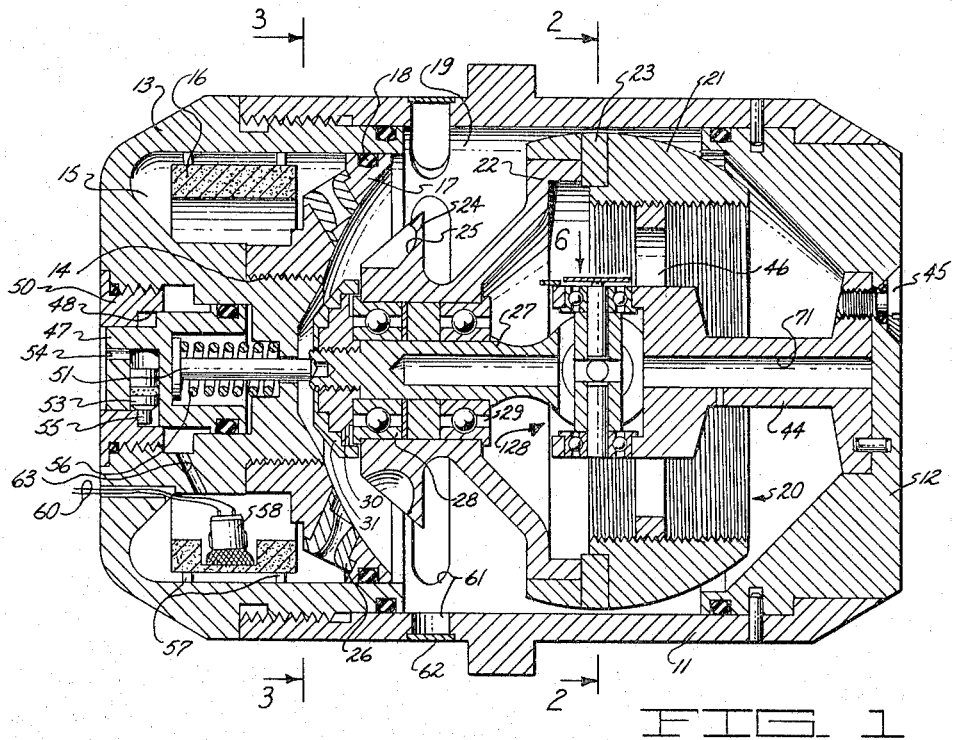
FIG. 1 is a longitudinal sectional view through a gyroscope embodying a preferred form of the present invention.
Figure 2:
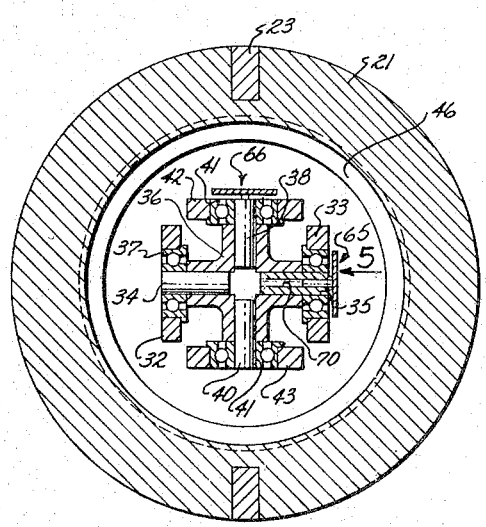
FIG. 2 is a sectional view through the rotor and gimbal means and is taken along the line 2—2 of FIG. 1.

Referring to the drawings, the gyroscope comprises a cylindrical case 11 preferably of aluminum or other non-magnetic material, to the right-hand end of which is secured an end cap 12. A removable cover 13 is threadably attached to the opposite end of the case. The cover has a central hub 14 and forms an annular propellant chamber or compartment 15 to receive an annular gas generating propellant 16. The chamber is closed by a removable bulkhead or wall 17, the latter being threadably attached to the hub and hermetically sealed around its periphery by an O-ring 18 of rubber or the like fitted within a circumferentially extending groove formed in the bulkhead and engaging the inner surface of the cover.

The remainder of the interior of the case 11 forms a rotor compartment 19 in which a hollow rotor, generally indicated at 20, is provided. The latter is formed of a rim 21 of relatively heavy metal, such as brass, and a hub 22 of relatively light metal, such as aluminum, which is suitably secured to the rim. A pair of diametrically opposed permanent magnets 23 are suitably embedded in the rim for the purpose of actuating a suitable magnetically responsive counting mechanism (not shown) which is effective to sense the movement of the magnets through the case whereby the speed of the rotor may be determined.

Figure 3:
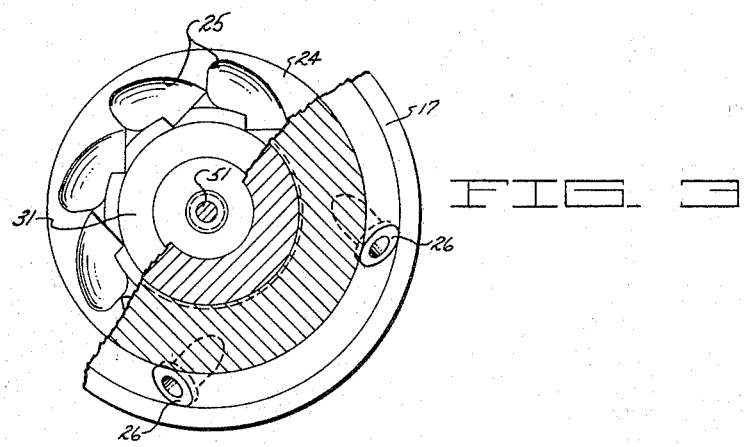
FIG. 3 is a sectional view taken substantially along the line 3—3 of FIG. 1.

The rotor hub 22 is formed into a conical turbine head 24 having pockets 25 therein adapted to receive streams of propellant gases from jets 26 mounted in the bulkhead 17 and communicating the interior of the propellant chamber with the rotor compartment. As seen particularly in FIG. 3, the jets are spaced around the bulkhead 17 and are directed at an angle to the turbine head 24 to cause the streams of propellant gases transmitted thereby to impinge on the pockets 25 and thus effect rotation of the rotor.

The rotor is rotatably mounted on a shaft 27 by ball bearings 28 and 29. The bearings are retained on the shaft by a pair of nuts 30 and 31, which are threaded in tandem on one end of the shaft and are formed to jointly comprise a labyrinth seal surrounding the bearing 28 which effectively prevents any products of combustion, such as ashes and other solids, carried by the propelling gases from entering the beaings.

The shaft 27 forms part of a gimbal means generally indicated at 128 and located within the hollow rotor. For this purpose, the shaft is formed at its right-hand end into a bifurcated yoke constituting a first gimbal and comprising two spaced arms 32 and 33 which are pivotally supported by coaxially extending shaft sections 34 and 35 of a center block 36 through ball bearings 37. The center block, constituting a second gimbal, is, in turn, pivotally supported by coaxial shaft sections 38 and 40 pivotally mounted by ball bearings 41 mounted in spaced arms 42 and 43 forming the yoked end of a pedestal 44, the latter being attached by screws, i.e., 45, to the end cap 12. The axes of the shaft sections 34 and 38 are mutually perpendicular to each other and to the axis of rotation of the rotor to permit universal positioning of the case relative to the rotor.

It will be noted that the rotor 20 is balanced about the intersection of the axes of shaft sections 34 and 38 and to effect minor adjustment of such balance, a counterweight in the form of an annular ring 46 is adjustably threaded on the interior of the rim.

The caging mechanism comprises a piston 47 which is slideable in a cylinder 48 formed in the hub 14 of the case cover 13. An annular bushing 50 is threadably mounted in the cover to guide the outer end of the piston and to limit outward movement thereof. The piston carries a caging pin 51 which extends through an opening in the hub 14. The pin has a conical end 49 which is adapted to cage the gyroscope by engaging an axial opening 52 formed in the shaft 27, as shown in FIG. 1.

For the purpose of maintaining the gyroscope in caged condition, a locking plunger 53 is slideably mounted in a guide hole extending radially in the piston and communicating with the atmosphere through a vent 54. The plunger is provided with a latching shoulder 55 which, when the piston is moved to its caging position shown in FIG. 1 against the action of a compression spring 56, may be moved into latching engagement with a shoulder on the bushing 50.

It will be noted that the propellant ring 16 is formed into a combustible solid material and is suitably held out of contact with the walls of the propellant compartment by spacers 57, thereby permitting ignition of all surfaces thereof so as to facilitate rapid generation of propellant gases which are directed in the form of streams onto the turbine head of the rotor by the jets 26. An electrically operable firing cap 58 is attached to the propellant ring 16 and is controlled by wires 60 from a suitable source outside the case. In lieu of the propellant ring 16, the propellant may be formed of a plurality of separate pieces in which the surfaces thereof are preferably out of contact with each other and with the walls of the propellant compartment.

The case 11 is provided with exhaust slots 61 extending through the wall thereof to permit venting of spent propellant gases after they impinge on the turbine head. Prior to ignition of the propellant, such openings are sealed by frangible covers 62 of aluminum foil or the like.

Upon ignition of the propellant ring, the propellant gases generated thereby cause rotation of the rotor and are also transmitted through an opening 63 in the hub 14 to the cylinder 48. As the pressure of such gas builds up, the piston is forced slightly to the right to center the shaft 27 and thereby hold the gyroscope in proper caged condition. At the same time, the gases force the latching plunger 53 radially inwardly of the piston 47 to remove the latching shoulder 55 from engagement with the bushing 50. Concurrently, the buildup of pressure within the rotor compartment causes rupturing of the covers 62 to permit venting of the spent gases.

Figure 4:
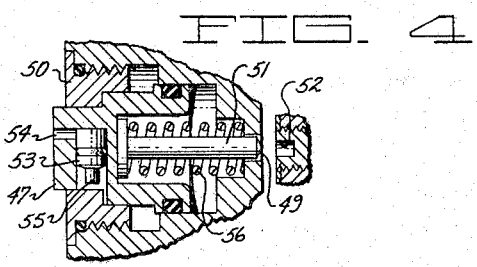
FIG. 4 is a fragmentary view similar to FIG. 1 but illustrating the caging device in uncaged condition.
Figure 5:
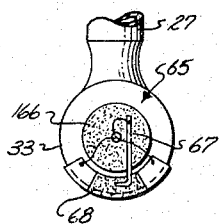
FIG. 5 is a side view of part of the movable gimbal.
Figure 6:
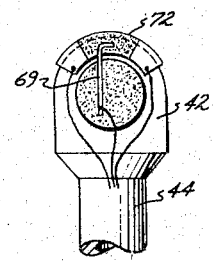
FIG. 6 is a plan view of a part of the stationary gimbal.

After the rotor has been brought up to optimum speed and the propellant ring has burnt out, the pressure of the exhaust gases lowers to a point where the spring 56 becomes effective to force the pin 51 and piston 47 to the left into their positions shown in FIG. 4, thereby uncaging the gyroscope.

Means are provided for indicating the attitude of the case relative to the axis of the rotor during operation of the gyroscope. For this purpose, two potentiometer pickoff devices, generally indicated at 65 and 66, are mounted on the gimbal means to indicate the relative position of the case about two axes of movement.

The pickoff device 65, which is representative of both pickoff devices, comprises a plate 166 of insulating material which is attached to the shaft section 35 of the center block 36. Such plate carries a flexible wiping brush 67 which is in wiping engagement with an electrically resistive layer on a second plate 68 of insulating material which is suitably attached to the yoke arm 33 of the rotor support shaft 27. The similar brush 69 of the second pickoff device is carried by the shaft section 38 of the center block and is in wiping engagement with a resistive layer on a plate 72 carried by the arm 42 of the pedestal 44. Flexible wires connected to the brushes and conductive layers of the pickoff devices are passed through longitudinally extending passages, i.e., 70, in the center block and a similar passage 71 in the pedestal 44 to appropriate indicating and/or control devices not shown.

Although the invention has been described in detail and certain specific terms and languages have been used, it is to be understood that the present disclosure is illustrative rather than restrictive and that changes and modifications may be made without departing from the spirit or scope of the invention as set forth in the claims appended hereto.

Having thus described the invention, what is desired to be secured by United States Letters Patent is:

1. A gyroscope comprising a hollow rotor, a support rotatably supporting said rotor for movement about a spin axis, said support having spaced arms extending within said rotor on opposite sides of said spin axis, a universal pivot member, bearings in said arms supporting said pivot member between said arms for movement about a second axis intersecting said spin axis, said second axis extending at right angles to said spin axis, said pivot member having a passage extending therein coaxially of one of said bearings, a support element having spaced arms on opposite sides of said spin axis, bearings in said last mentioned arms supporting said pivot member between said last mentioned arms for movement about a third axis intersecting said spin axis, said third axis extending at right angles to said second axis, said support element having a passage extending therein, means responsive to angular movement between said support and said pivot member for indicating said angular movement, and a flexible conductor extending serially through said passages and operatively connected to said last mentioned means for conveying said indication.

2. A gyroscope comprising a hollow rotor, a support rotatably supporting said rotor for movement about a spin axis, said support having spaced arms extending within said rotor, a universal pivot member, bearings in said arms supporting said pivot member for movement about a second axis intersecting said spin axis and the center of mass of said rotor, said second axis extending perpendicular to said spin axis, said pivot member having a passage extending therethrough coaxially of one of said bearings, a support element having spaced arms, bearings in said last mentioned arms supporting said pivot member for movement about a third axis intersecting said spin axis and said center of mass, said third axis extending perpendicular to said second axis, said support element having a passage extending therethrough, means responsive to angular movement between said support and said pivot member for indicating said angular movement, and a flexible conductor extending serially through said passages and operatively connected to said last mentioned means for conveying said indication.

3. A gyroscope comprising a hollow rotor, a support rotatably supporting said rotor for movement about a spin axis, said support having spaced arms extending within said rotor, a universal pivot member, bearings in said arms supporting said pivot member for movement about a second axis intersecting said spin axis and the center of mass of said rotor, said second axis extending perpendicular to said spin axis, said pivot member having a passage therethrough coaxially of one of said bearings, a support member having spaced arms, bearings in said last mentioned arms supporting said pivot member for movement about a third axis intersecting said spin axis and said center of mass, said third axis extending perpendicular to said second axis, said support element having a second passage extending therein, electrical means responsive to angular movement between said support and said pivot member for indicating said angular movement, and flexible electrical conductors extending serially through said passages and operatively connected to said last mentioned means for conveying said indication.

References Cited by the Examiner

UNITED STATES PATENTS

| | | | |
|---|---|---|---|
| 2,592,643 | 4/1952 | Barnes | 74—5.34 |
| 2,911,832 | 11/1959 | Thierman | 74—5.6 X |
| 2,981,061 | 4/1961 | Lilligren | 74—5.7 X |
| 3,078,728 | 2/1963 | Schlesman | 74—5 |

FRED C. MATTERN, Jr., *Primary Examiner.*

MILTON KAUFMAN, *Examiner.*

J. D. PUFFER, *Assistant Examiner.*